United States Patent
Nishikawa et al.

(10) Patent No.: US 8,146,296 B2
(45) Date of Patent: Apr. 3, 2012

(54) ENCLOSURE STRUCTURE FOR BUILDING

(75) Inventors: Kaoru Nishikawa, Shinjuku-ku (JP); Takuya Nakao, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 118 days.

(21) Appl. No.: 12/817,257

(22) Filed: Jun. 17, 2010

(65) Prior Publication Data

US 2010/0251618 A1  Oct. 7, 2010

Related U.S. Application Data

(63) Continuation of application No. PCT/JP2008/073831, filed on Dec. 26, 2008.

(30) Foreign Application Priority Data

Dec. 27, 2007  (JP) .................................. 2007-335655

(51) Int. Cl.
*H01L 31/042* (2006.01)
*H01L 31/048* (2006.01)
*E04H 15/20* (2006.01)
*E04D 13/18* (2006.01)

(52) U.S. Cl. ............. 52/2.23; 52/2.22; 52/173.3; 47/17; 165/48.2; 136/244; 136/245; 136/251

(58) Field of Classification Search .................... 52/2.22, 52/2.23, 173.3
See application file for complete search history.

(56) References Cited

U.S. PATENT DOCUMENTS

| 3,375,136 A | * | 3/1968 | Biggar | 429/127 |
| 3,658,596 A | * | 4/1972 | Osborne | 136/251 |
| 3,908,631 A | * | 9/1975 | Rom | 126/625 |
| 4,057,439 A | * | 11/1977 | Lindmayer | 136/251 |
| 4,182,307 A | * | 1/1980 | Brindle et al. | 126/625 |

(Continued)

FOREIGN PATENT DOCUMENTS

JP   5-221387 A  *  8/1993

(Continued)

OTHER PUBLICATIONS

Liu Jianming, et al., "Structural analysis and comparison for double-layer ETFE cushions", Journal of Southeast University ( Natural Science Edition), vol. 37, No. 5, Sep. 2007, pp. 910-914 (with English Abstract).

(Continued)

*Primary Examiner* — Robert Canfield
(74) *Attorney, Agent, or Firm* — Oblon, Spivak, McClelland, Maier & Neustadt, L.L.P.

(57) ABSTRACT

To provide an enclosure structure for a building, which can maintain a high power generation efficiency without formation of irregularities on the surface of the enclosure such as a roof, nor application of an external force to solar battery modules, and which can form a lightweight enclosure capable of photovoltaic generation.

An enclosure structure for a building, comprising an outer film material made of a light transmitting material and arranged on the outer surface side of the building, an inner film material arranged along inside of the outer film material, an intermediate film material disposed between the outer film material and the inner film material, an air supply means for supplying air to the space between the outer film material and the inner film material, and solar battery modules 7 provided on the inner surface of the intermediate film material.

8 Claims, 4 Drawing Sheets

U.S. PATENT DOCUMENTS

| | | | | |
|---|---|---|---|---|
| 4,258,697 A * | 3/1981 | Flagg | ............................ | 126/596 |
| 4,321,418 A * | 3/1982 | Dran et al. | .................... | 136/251 |
| 4,321,912 A * | 3/1982 | Larsen | .......................... | 126/625 |
| 4,404,958 A * | 9/1983 | Boettcher | ..................... | 126/625 |
| 4,485,804 A * | 12/1984 | Sharpe | ......................... | 126/625 |
| 6,224,016 B1 * | 5/2001 | Lee et al. | ......................... | 244/30 |
| 6,860,069 B2 * | 3/2005 | Morris | .......................... | 52/2.22 |
| 7,227,077 B2 * | 6/2007 | Kleinwachter | ............... | 136/248 |
| 7,303,166 B2 * | 12/2007 | Geery | ............................ | 244/30 |
| 7,415,799 B2 * | 8/2008 | Morris | .......................... | 52/2.11 |
| 7,849,635 B2 * | 12/2010 | Langner | ........................ | 52/2.22 |
| 2007/0234945 A1 * | 10/2007 | Khouri et al. | ................. | 114/266 |
| 2011/0054252 A1 * | 3/2011 | Ozaki et al. | ................... | 600/109 |
| 2011/0110076 A1 * | 5/2011 | Langner | ........................ | 362/145 |
| 2011/0154749 A1 * | 6/2011 | Chen et al. | ................... | 52/173.3 |

FOREIGN PATENT DOCUMENTS

| | | |
|---|---|---|
| JP | 10-121785 | 5/1998 |
| JP | 11-046007 | 2/1999 |

OTHER PUBLICATIONS

Chinese Office Action issued Jun. 10, 2011, in Patent Application No. 200880123199.X (with English-language translation).

Liu Jianming, et al., "Structural analysis and comparison for double-layer ETFE cushions", Journal of Southeast University (Natural Science Edition), vol. 37, No. 5, Sep. 2007, pp. 910-914 (with English Abstract).

\* cited by examiner

ENCLOSURE STRUCTURE FOR BUILDING

CROSS-REFERENCE TO RELATED APPLICATIONS

This application is a continuation of PCT/JP2008/073831 filed Dec. 26, 2008, which claims priority to Japanese Application No. JP2007-335655 filed Dec. 27, 2007. The contents of each of the above applications are incorporated herein by reference.

TECHNICAL FIELD

The present invention relates to an enclosure structure for various buildings such as an atrium and a greenhouse, which has a double film structure and has a power generation function by the sunlight.

BACKGROUND ART

In recent years, from demands for environmental protection and energy saving, a technique of installing solar battery modules on a roof which is one type of an enclosure for a building and converting the sunlight energy which is natural energy to electric power to use it as a power resource for inside of the building and also to sell remained power, is in practical use.

On the other hand, as the roof structure, a structure composing the roof by disposing a film material is known.

Since in such a roof structure using a film material, the film surface has a curved shape with a specific tension applied, there is a problem of the difficulty to attach the above mentioned solar battery modules.

Therefore, the following Patent Document 1 proposes an attaching structure of a solar battery attached on the film surface in such a manner that flexible modules are used as the above solar battery modules, and the periphery of a thermoplastic resin film capable of covering the whole of the flexible solar battery modules is welded to the film surface to store the flexible solar battery modules therein.

Patent Document 1: JP-A-11-46007

DISCLOSURE OF THE INVENTION

Object to be Accomplished by the Invention

However, with respect to the above conventional attaching structure of a solar battery in the roof structure using a film material, since a convex caused by covering the flexible solar battery modules with a resin film is formed on the surface of the film material, dust or the like is likely collect on a step part formed with the film material, thus leading to a decrease in the power generation efficiency or an obstacle to snow slipping in a snow season.

Besides, there are also problems that since the periphery of a thermoplastic resin film is welded on the surface of a thin film material, the film material at the welded part is hardened or weakened, and further, that the film material is likely to break because of the concentration of the stress, caused by an increase in the rigidity of the welded part.

The present invention has been made under the above mentioned circumstances and its object is to provide an enclosure structure for a building, capable of forming a lightweight enclosure capable of photovoltaic generation, which prevents formation of a concavo-convex on the outer surface of the enclosure such as a roof or a wall, and application of an external force to solar battery modules, and which can maintain a high power generation efficiency.

Means to Accomplish The Object

In order to accomplish the above object, the present invention provides an enclosure structure for a building, comprising an outer film material made of a light transmitting material and arranged on the outer surface side of the building, an inner film material arranged along inside of the outer film material, an air supply means for supplying air to the space between the outer film material and the inner film material, and solar battery modules provided on the inner surface (the surface on the space side) of the inner film material.

Further, the present invention provides an enclosure structure for a building, comprising an outer film material made of a light transmitting material and arranged on the outer surface side of the building, an inner film material arranged along inside of the outer film material, an intermediate film material disposed between the outer film material and the inner film material in a state to or not to provide communication between the outer film material and the inner film material, an air supply means for supplying air to the space between the outer film material and the inner film material, and solar battery modules provided on the surface of the intermediate film material facing the outer film material.

In the present invention, the inner film material is preferably air-tightly integrated along the periphery with the outer film material.

In the present invention, the solar battery modules preferably have flexibility.

Further, in the present invention, the solar battery modules are preferably battery modules using an amorphous silicon solar battery.

Furthermore, according to a preferred embodiment of the present invention, the output sides of the solar battery modules are connected to a battery, and at least a part of the electric power stored by the battery is supplied as a drive resource for the air supply means.

Furthermore, according to a preferred embodiment of the present invention, the solar battery modules are arranged with a space one another so that the sunlight is transmitted between the solar battery modules.

Effects of the Invention

In the preferred embodiment of the present invention, a building panel having a cushion type double film structure having a space between the outer film material and the inner film material filled with air under pressure (hereinafter referred to as a pneumatic panel) is used as an enclosure material, and solar battery modules are assembled inside the pneumatic panel. In this case, with respect to the pneumatic panel comprising the outer film material and the inner film material, since particularly the outer film material is largely strained and the strain amount changes by e.g. a change of an external force or an internal pressure, it is difficult to provide the solar battery modules directly on the outer film material. Therefore, it is preferred to provide the solar battery modules on the inner surface of the inner film material, where the affect of the external force is relatively small.

Further, with respect to the enclosure structure comprising an intermediate film material disposed between the outer film material and the inner film material, and solar battery modules provided on the surface of the intermediate film material facing the outer film material, since the intermediate film material is unaffected by e.g. the change of the internal pressure, it is possible to maintain the shapes of the solar battery modules in a stable state.

Further, with respect to the enclosure structure of the present invention, since the outer film material is made of a light transmitting material, the sunlight is transmitted through the outer film material and applied to the solar battery modules, whereby it is possible to generate power.

Therefore, it is possible to form a lightweight enclosure such as a roof or a wall, capable of photovoltaic generation, and further, when the inner film material and the intermediate film material are also made of a light transmitting material, the sunlight can enter a building. Accordingly, it is possible to suitably use it as e.g. a roof or a wall of a building such as an atrium, a horticultural greenhouse or a pool which is an original application of the pneumatic panel.

Further, in the enclosure structure, since the whole of the solar battery modules is provided inside the pneumatic panel, no external force will be applied to the solar battery modules, whereby it is possible to maintain a high power generation efficiency for a long period of time. Furthermore, since no protrusion will be formed on the outer surface of the film material, dust or the like will not collect, so that no reduction in the power generation efficiency nor obstacle to snow slipping in a snow season will occur.

Further, in the enclosure structure comprising solar battery modules provided on the intermediate film material, the solar battery modules are not provided on the outer film material and the inner film material, respectively constructing the outer surface and the inner surface of the enclosure, while they are subjected to a tension by air supplied to the inside, and the solar battery modules are provided on the intermediate film material disposed between the outer film material and the inner film material. Therefore, unlike a conventional one, there is no risk that the outer film material or the inner film material constructing the pneumatic panel itself is broken due to the attachment of the solar battery modules.

Further, with respect to such an enclosure structure, in a case where the intermediate film material is disposed in a state to provide communication between the outer film material and the inner film material, by supplying air to the inside from either between the film material and the intermediate film material, or between the intermediate film material and the inner film material, whereby it is possible to form the pneumatic panel by uniformly pressurizing the whole of inside without the intermediate film material being an obstacle.

Here, as the solar battery modules, various solar battery modules using e.g. a single crystal silicon solar battery, a polycrystal silicon solar battery, an amorphous silicon solar battery or a single crystal+amorphous hybrid solar battery are known. Here, since a crystal silicon solar battery has a drawback that its mechanical strength is small and it is easily broken, it is usually used by combining a reinforcing member so that there will be no problem for handling.

On the other hand, an amorphous silicon solar battery has advantages that it is a thin film and it has flexibility, whereby it will not break easily.

For the reference, in the enclosure structure having an intermediate member provided, since the solar battery modules are provided on the intermediate film material, it is possible to apply both the solar battery modules using a crystal silicon solar battery and an amorphous silicon solar battery.

However, the intermediate film material also has flexibility, and as a result, the enclosure structure will be deformed as a whole. Therefore, in the present invention, it is preferred to use one having flexibility as the solar battery modules.

Further, particularly when battery modules using an amorphous silicon solar battery are used as the above solar battery modules, the enclosure structure will have flexibility and a high voltage will be obtained as compared with one using the crystal silicon solar battery.

Further, while there is a tendency in the above pneumatic panel that the inner temperature becomes higher by sunlight, there is a tendency generally in a solar battery that the output decreases as the temperature increases.

However, with respect to the above amorphous silicon solar battery, by an annealing phenomenon, the decrease in the output is small even when the temperature increases. Therefore, by the solar battery modules using an amorphous silicon solar battery, it is possible to obtain a power generation efficiency higher by about 10% than the crystal silicon solar battery.

Further, in the preferred embodiment of the present invention, the output sides of the solar battery modules are connected to a battery, and at least a part of the electric power stored by the battery is supplied as a drive resource for the air supply means such as a fan. Therefore, it is possible to constitute an enclosure structure using a self-support pneumatic panel which does not need power supply from outside.

Further, in the preferred embodiment of the present invention, since a plurality of solar battery modules are arranged with a space one another so that the sunlight is transmitted between them, it is possible to obtain desired light inside a building.

MEANINGS OF SYMBOLS

Figure 1:
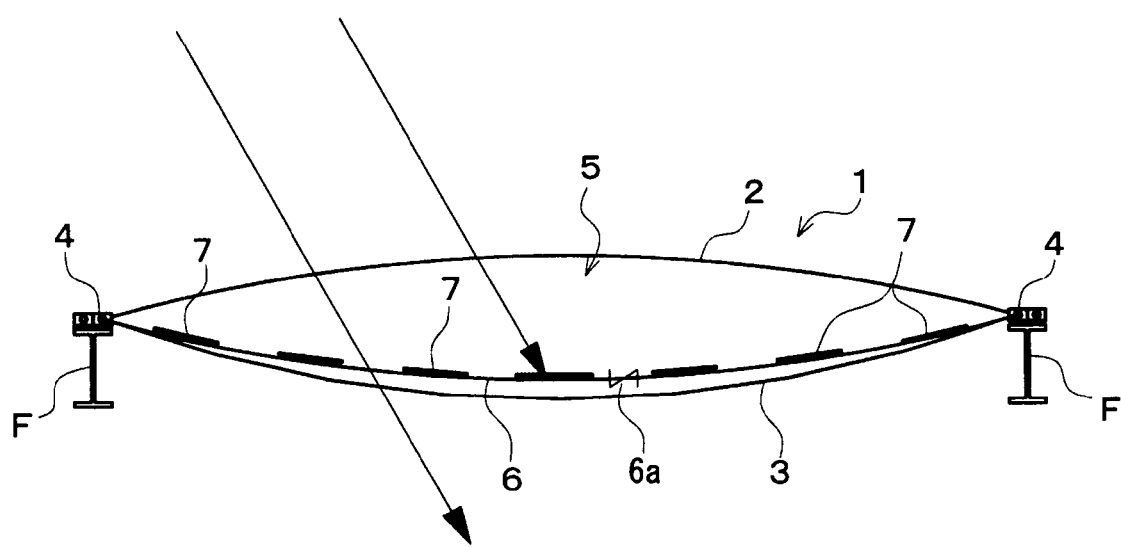
FIG. 1 is a cross-sectional view illustrating the pneumatic panel structure according to one embodiment of the enclosure structure for a building of the present invention.

1: Pneumatic panel
2: Outer film material
3: Inner film material
5: Inner space
6: Intermediate film material
6a: Opening
7: Solar battery module
8: Battery
11: Fan (air supply means)
C: Building

BEST MODE FOR CARRYING OUT THE INVENTION

Figure 2:
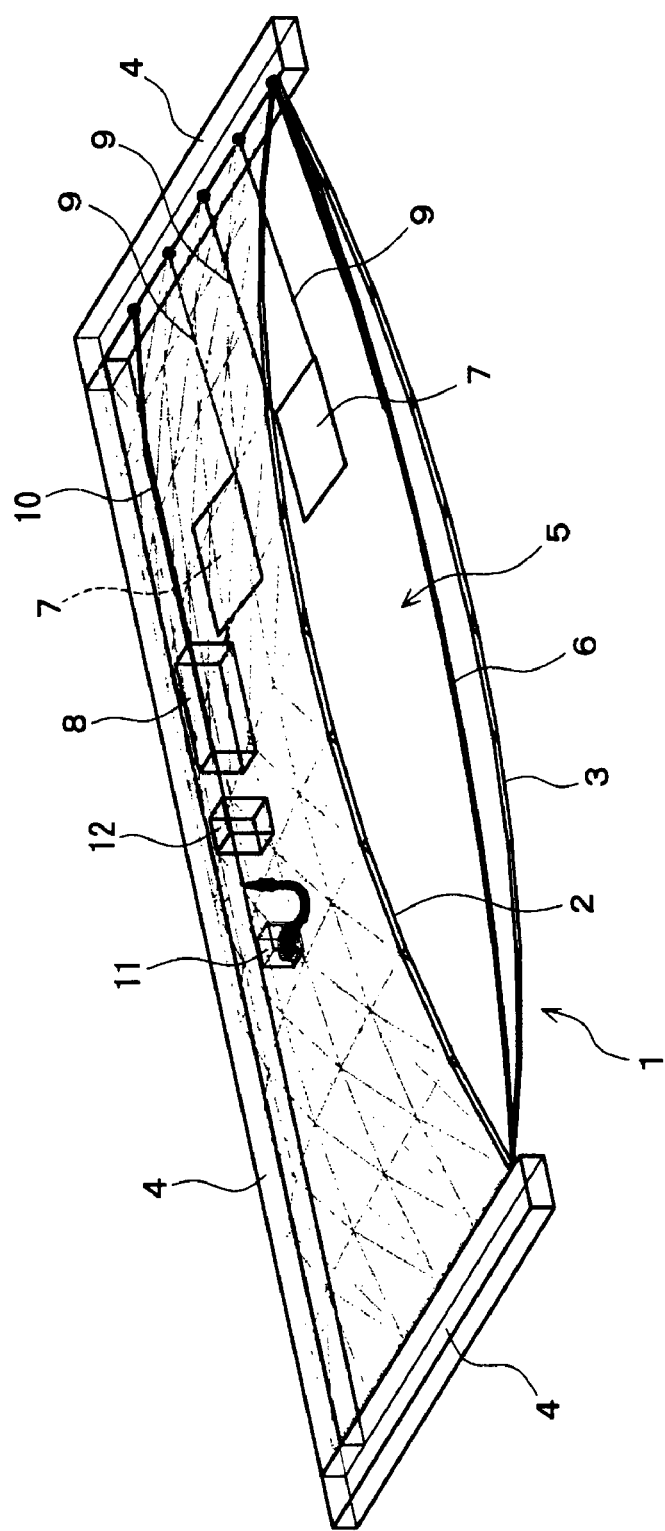
FIG. 2 is a perspective view illustrating FIG. 1 partly in section.
Figure 3:
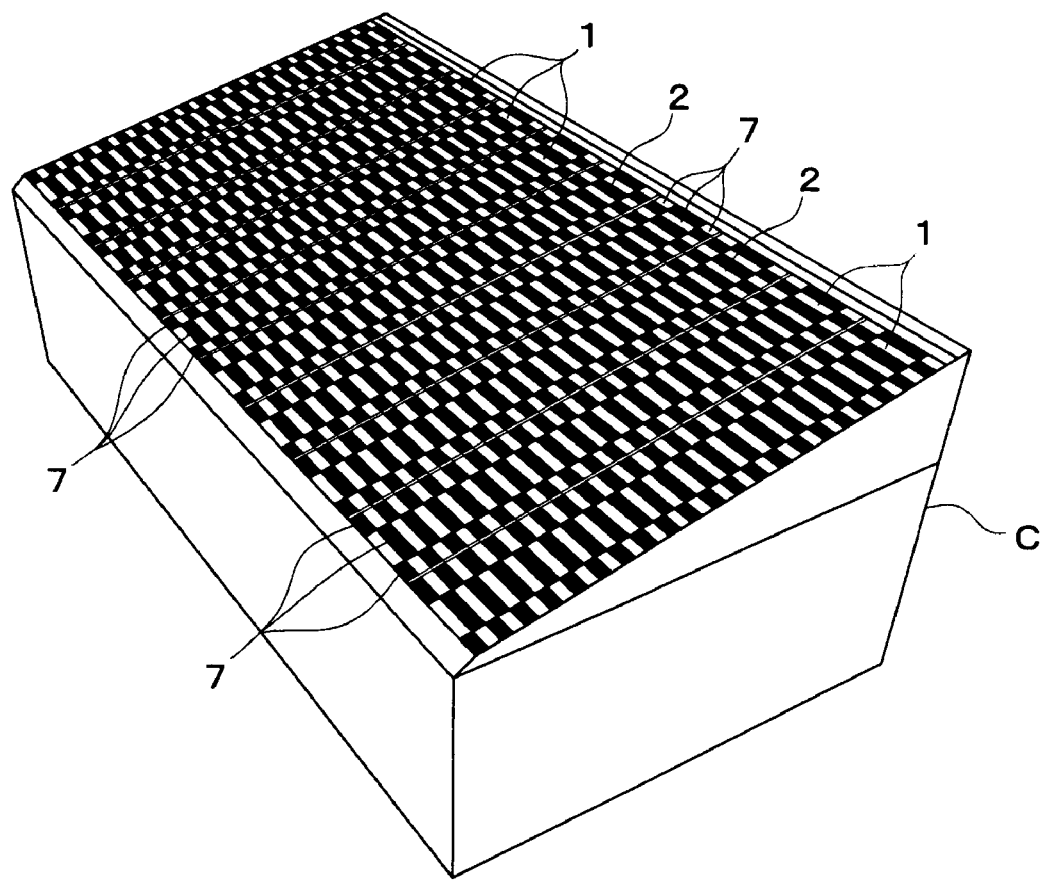
FIG. 3 is a perspective view illustrating the whole of a building of FIG. 1.
Figure 4:
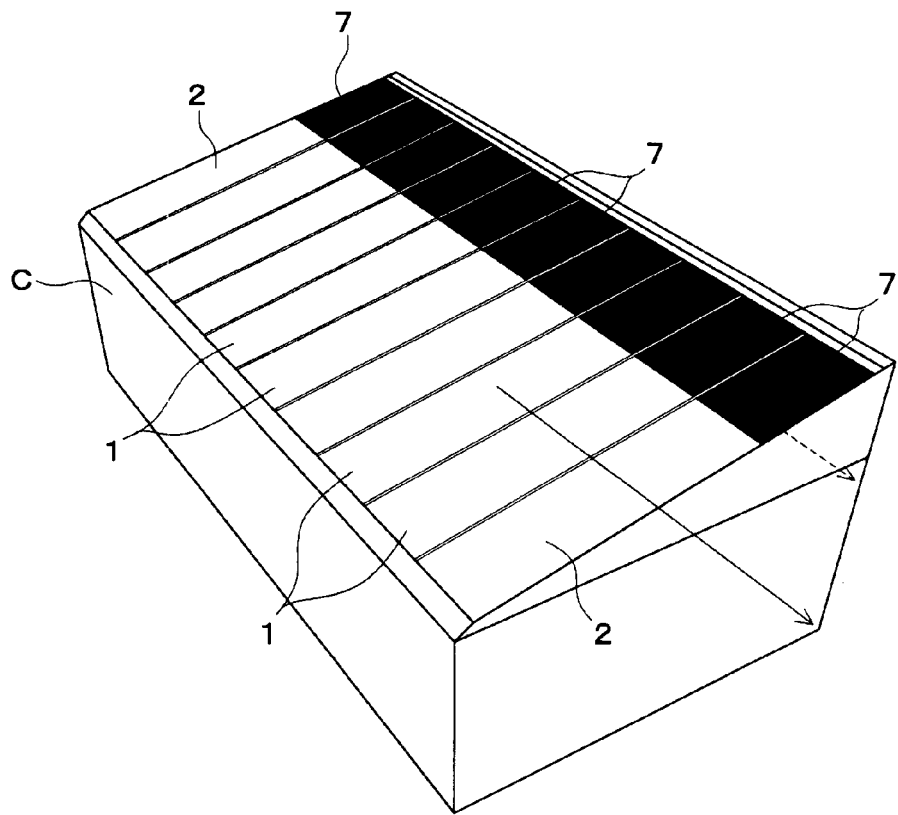
FIG. 4 is a perspective view of the whole of a building, illustrating a modification of the above one embodiment.

FIGS. 1 to 3 illustrate one embodiment wherein the enclosure structure for a building of the present invention is applied to a roof structure of a building, and FIG. 4 illustrates its modification.

In these Figs., the roof structure of a building C is schematically constituted by providing a plurality of solar battery modules 7 inside a pneumatic panel 1.

That is, the pneumatic panel 1 comprises an outer film material 2 and an inner film material 3 formed in two rectangle sheets, each made of a transparent plastic film material such as an ethylene/tetrafluoroethylene copolymer (hereinafter referred to as ETFE), air-tightly integrated along the respective peripheries, and held by a peripheral frame 4. As a result, an inner space 5 is created between the outer film material 2 and the inner film material 3. Further, the roof of the building C is constituted by a plurality of such pneumatic panels 1 supported by the peripheral frame 4 in such a manner that the respective outer film materials 2 are declined facing the sun on the outer surface side of the building C and the inner film materials 3 are arranged facing the inside of the building C, and such peripheral frames 4 being connected with and supported by a beam/column structure F of the building C.

Further, the pneumatic panel 1 has an intermediate film material 6 disposed between the outer film material 2 and the inner film material 3. The intermediate film material 6 is made of a transparent plastic film material such as ETFE in the same manner as the outer film material 2 and the inner film material 3 as is formed into a shape such that the sag is somewhat smaller than that of the inner film material 3, and its periphery is sandwiched between peripheries of the outer film material 2 and the inner film material 3 and integrated therewith. Further, the intermediate film material 6 has an opening 6a formed to communicate the upper space between it and the outer film material 2 with the lower space between it and the inner film material 3.

Further, on the upper surface of the intermediate film material 6, a plurality (among them, only two sheets are exemplified in FIG. 2) of solar battery modules 7 are attached with a predetermined space one another. The solar battery modules 7 are battery modules using an amorphous silicon solar battery and are attached to the intermediate film material 6 with their light receiving cell surface facing upward.

Further, the above plurality of the solar battery modules 7 can be arranged optionally, and in the building C according to the present embodiment, they are arranged in a checkerboard pattern over the entire surface of the roof as illustrated in FIG. 3. Therefore, between the solar battery modules 7, the sunlight can enter the building C through the outer film material 2, the intermediate film material 6 and the inner film material 3.

On the other hand, a battery 8 is provided under the peripheral frame 4 of the pneumatic panel 1. Electric wires 9 connected to the output sides of the respective solar battery modules 7 attached to the intermediate film material 6 are drawn toward the peripheral frame 4 side in the pneumatic panel 1, and then, become an assembled line 10 to be connected to the input side of the battery 8. Thus, the electric power generated by the power generation by the solar battery modules 7 is input and stored in the battery 8.

Further, under the peripheral frame 4, a fan (air supply means) 11 supplying air (gas) to between the inner film material 3 and the intermediate film material 6 in the pneumatic panel 1, and a timer 12 maintaining the internal pressure of the pneumatic panel 1 at a predetermined range by supplying the electric power stored in the battery 8 to the fan 11 by on-off control at predetermined time intervals interlocked with the decrease speed of the internal pressure in the pneumatic panel 1, are provided adjacent to each other.

According to the roof structure of the building C with the above constitution, since the solar battery modules 7 are provided on the upper surface of the intermediate film material 6 in the pneumatic panel 1 where the strain by e.g. a change of an external force or an internal pressure rarely occurs, it is possible to maintain the shapes of the solar battery modules 7 in a stable state. Further, as illustrated in FIG. 1, a part of the sunlight which has reached the roof is transmitted through the light transmitting outer film material 2 and applied to the surface of the solar battery modules 7 to generate power.

Therefore, it is possible to form a lightweight roof capable of photovoltaic generation, and since the outer film material 2, the inner film material 3 and the intermediate film material 6 in this roof structure are all made of a light transmitting material, the sunlight transmitted between the solar battery modules 7 can enter a building.

Besides, in the roof structure, since the whole of the solar battery modules 7 are provided inside the pneumatic panel 1, no external force will be applied to the solar battery modules 7, whereby it is possible to maintain a high power generation efficiency for a long period of time, and since no protrusion will be formed on the outer surface of the outer film material 2 and the inner film material 3, unlike a conventional one, dust or the like will not collect, so that no reduction in the power generation efficiency nor obstacle to snow slipping in a snow season will occur.

Further, the periphery of the intermediate film material 6 is sandwiched between the peripheries of the outer film material 2 and the inner film material 3 and is integrated therewith, and the opening 6a is arranged on the intermediate film material 6 to provide communication between the outer film material 2 and the inner film material 3. Therefore, it is possible to form the pneumatic panel 1 by uniformly pressurizing the whole of inside without the intermediate film material 6 being an obstacle by supplying a gas inside from between the intermediate film material 6 and the inner film material 3, and furthermore, it is also possible to maintain the solar battery modules 7 stably by stabilizing the posture of the intermediate film material 6.

However, the pneumatic panel 1 may be formed by using the intermediate film material 6 without the opening 6a, and supplying a gas separately to the space between the outer film material 2 and the intermediate film material 6 and the space between the inner film material 3 and the intermediate film material 6 for pressurization.

Further, since battery modules using an amorphous silicon solar battery excellent in flexibility are used as the solar battery modules 7, even when the intermediate film material 6 sags, no cracks will occur and a high voltage will be obtained as compared with one using a crystal silicon solar battery. Besides, even when the internal temperature of the pneumatic panel 1 is increased by the sunlight, it is possible to obtain a power generation efficiency higher by about 10% than solar battery modules using other crystal silicon solar battery.

Further, in this roof structure, the output obtained by the power generation by the solar battery modules 7 is stored in the battery 8 and is used as a drive resource for the fan 11 which is to maintain the internal pressure of the pneumatic panel 1 constant. Therefore, it is possible to constitute a roof structure using a self-support pneumatic panel which requires no power supply from outside.

FIG. 4 illustrates a modification of the above embodiment.

This roof structure is different from one illustrated in FIG. 3 in that solar battery modules 7 are intensively arranged on an intermediate film material 6 inside a pneumatic panel 1 located at the upper part of a declined roof of a building C, and no solar battery modules are arranged inside the pneumatic panel 1 located at the lower part.

According to the roof structure of the above constitution, since the solar battery modules 7 are intensively arranged at the upper part of the declined roof, as illustrated by broken line arrows in FIG., the position of a shadow created by the sunlight being shut off by these solar battery modules 7 is formed on the wall surface of the building C. Therefore, even when the above roof structure is applied to a building C which requires sufficient sunlight even on the floor, such as an atrium, a horticultural greenhouse or a pool, such an effect can be obtained that shutting off the sunlight by the solar battery modules 7 is not problematic.

Here, the above embodiment has been explained only with reference to a case where the enclosure structure of a building according to the present invention is applied to a roof structure of a building. However, the present invention is by no means limited thereto, and it is also applicable to other enclosure structures such as a wall in the same manner.

Figure 5:
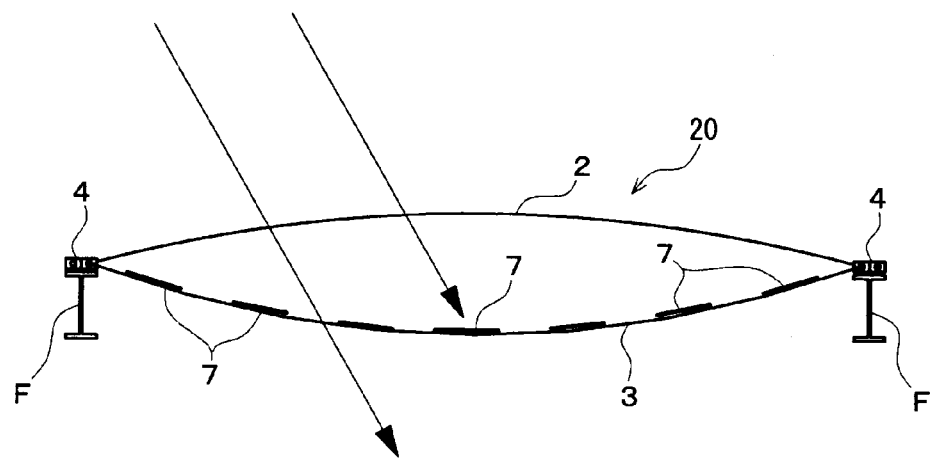
FIG. 5 is a cross-sectional view illustrating the structure of a pneumatic panel according to another embodiment of the present invention.

Further, the above embodiment has been explained only with reference to a case where the intermediate film material 6 is provided between the outer film material 2 and the inner film material 3, and the solar battery modules 7 are attached on the upper surface of the intermediate film material 6. However, the present invention is by no means limited thereto, and for example, as illustrated in FIG. 5, it is also possible to constitute a pneumatic panel 20 only with an outer film material 2 and an inner film material 3 and to provide solar battery modules 7 on the upper surface of the inner film material 3.

Further, the above embodiment has been explained only with reference to a case where the outer film material 2 and the inner film material 3 are air-tightly integrated along the respective peripheries. However, the present invention is by no means limited thereto, and the outer film material 2 and the inner film material 3 may be air-tightly sealed along the respective peripheries by, for example, a peripheral frame 4 or the like.

Further, the above embodiment has been explained only with reference to a case where the solar battery modules 7 using an amorphous silicon solar battery which is thin and excellent in flexibility, are provided on the intermediate film material 6 as the most preferable embodiment. However, the present invention is by no means limited thereto, and since particularly the intermediate film material 6 is rarely affected by the strain caused by a change of an external force or an internal pressure, unlike the outer film material 2 and the inner film material 3, it is also possible to provide solar battery modules using a crystal silicon solar battery.

INDUSTRIAL APPLICABILITY

The present invention provides an enclosure structure useful for various buildings such as an atrium and a greenhouse, which have a power generation function by the sunlight.

The entire disclosure of Japanese Patent Application No. 2007-335655 filed on Dec. 27, 2007 including specification, claims, drawings and summary is incorporated herein by reference in its entirety.

What is claimed is:

1. An enclosure structure for a building, comprising an outer film material made of a light transmitting material and arranged on the outer surface side of the building, an inner film material arranged along inside of the outer film material, an air supply means for supplying air to the space between the outer film material and the inner film material, and solar battery modules provided on the inner surface of the inner film material.

2. The enclosure structure for a building according to claim 1, wherein the inner film material is air-tightly integrated along the periphery with the outer film material.

3. The enclosure structure for a building according to claim 1, wherein the solar battery modules have flexibility.

4. The enclosure structure for a building according to claim 1, wherein the solar battery modules are battery modules using an amorphous silicon solar battery.

5. The enclosure structure for a building according to claim 1, wherein the output sides of the solar battery modules are connected to a battery, and at least a part of the electric power stored by the battery is supplied as a drive resource for the air supply means.

6. The enclosure structure for a building according to claim 1, wherein the solar battery modules are arranged with a space between one another so that the sunlight is transmitted between the solar battery modules.

7. An enclosure structure for a building, comprising an outer film material made of a light transmitting material and arranged on the outer surface side of the building, an inner film material arranged along inside of the outer film material, an intermediate film material disposed between the outer film material and the inner film material, an air supply means for supplying air to the space between the outer film material and the inner film material, and solar battery modules provided on the surface of the intermediate film material facing the outer film material.

8. The enclosure structure for a building according to claim 7, wherein the intermediate film material has an opening and is disposed in a state to provide communication between the outer film material and the inner film material.

* * * * *